(12) United States Patent
Shah et al.

(10) Patent No.: US 11,539,785 B2
(45) Date of Patent: Dec. 27, 2022

(54) SIMULTANEOUS CROSS-DEVICE APPLICATION PLATFORM

(71) Applicant: Microsoft Technology Licensing, LLC, Redmond, WA (US)

(72) Inventors: Shrey Nitin Shah, Redmond, WA (US); Meir Ben Itay, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 189 days.

(21) Appl. No.: 16/282,503

(22) Filed: Feb. 22, 2019

(65) Prior Publication Data
US 2020/0274919 A1   Aug. 27, 2020

(51) Int. Cl.
*H04L 67/10* (2022.01)
*H04L 67/141* (2022.01)
*G06F 9/54* (2006.01)

(52) U.S. Cl.
CPC .............. *H04L 67/10* (2013.01); *G06F 9/547* (2013.01); *H04L 67/141* (2013.01)

(58) Field of Classification Search
CPC ........ H04L 67/10; H04L 67/141; G06F 9/547
USPC ......................................................... 709/204
See application file for complete search history.

(56) References Cited

U.S. PATENT DOCUMENTS

| | | | | |
|---|---|---|---|---|
| 8,613,070 | B1 * | 12/2013 | Borzycki | G06F 21/6218 726/8 |
| 9,223,599 | B1 * | 12/2015 | Racanelli | G06F 9/45512 |
| 9,342,674 | B2 | 5/2016 | Abdallah et al. | |
| 10,162,624 | B1 * | 12/2018 | Moturu | G06F 9/45529 |
| 10,574,654 | B1 * | 2/2020 | Schroeder | H04L 63/0209 |
| 2004/0075619 | A1 * | 4/2004 | Hansen | G06F 9/451 345/1.1 |
| 2004/0239648 | A1 | 12/2004 | Abdallah et al. | |
| 2005/0278419 | A1 * | 12/2005 | Morris | H04L 67/36 709/203 |
| 2008/0134295 | A1 * | 6/2008 | Bailey | G06F 21/41 726/4 |
| 2013/0045803 | A1 * | 2/2013 | Kang | G07F 17/3223 463/42 |
| 2014/0179434 | A1 * | 6/2014 | Xu | A63F 13/798 463/31 |

(Continued)

OTHER PUBLICATIONS

"International Search Report and Written Opinion Issued in PCT Application No. PCT/US2020/017105", dated Jul. 20, 2020, 15 Pages.

*Primary Examiner* — Uzma Alam

(57) ABSTRACT

In non-limiting examples of the present disclosure, systems, methods and devices for providing a unified cross-platform experience are provided. A connection between a first device and a second device may be established, wherein the first device operates on a first platform and the second device operates on a second platform. A plurality of executable actions that are specific to the second device may be identified by the first device. Execution of at least one of the plurality of executable actions by the second device may be requested by the an application executed on the first device. Information obtained via execution of the at least one executable action may be received by the first device and the first device may present and/or display that information.

20 Claims, 10 Drawing Sheets

(56) References Cited

U.S. PATENT DOCUMENTS

| | | | |
|---|---|---|---|
| 2015/0006184 A1* | 1/2015 | Marti | G10L 15/22 |
| | | | 704/275 |
| 2016/0048286 A1* | 2/2016 | Picon | G06F 3/0488 |
| | | | 463/33 |
| 2016/0134932 A1* | 5/2016 | Karp | H04L 67/12 |
| | | | 348/207.11 |
| 2016/0142758 A1* | 5/2016 | Karp | H04N 21/25816 |
| | | | 725/25 |
| 2016/0191604 A1 | 6/2016 | Abiezzi et al. | |
| 2016/0269411 A1 | 9/2016 | Malachi | |
| 2017/0201524 A1* | 7/2017 | Dureau | G06F 21/35 |
| 2018/0033013 A1* | 2/2018 | Park | G06Q 20/325 |
| 2018/0121908 A1* | 5/2018 | Lin | G06Q 20/4012 |
| 2018/0189343 A1* | 7/2018 | Embiricos | G06F 16/2358 |
| 2018/0332004 A1* | 11/2018 | Drako | H04L 63/0236 |

* cited by examiner

SIMULTANEOUS CROSS-DEVICE APPLICATION PLATFORM

BACKGROUND

Computing devices have become ubiquitous in most aspects of life. It is now common for users to be connected to at least one device at any given time, and sometimes even two or three devices at once. One of the reasons that computing devices have become so ubiquitous to everyday users is due to the number of options available to those users. For any given device type (e.g., phone, tablet, laptop, desktop) there are multiple device manufacturers with their own set of hardware configurations, in addition to unique operating system types and application suites that may be run on those devices. Thus, it is not uncommon for a user to have, and frequently use, a smart phone that operates on a first platform, a tablet that operates on a second platform, and one or more desktop and/or laptop computing devices that operate on one or more additional platforms.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with simultaneous and collaborative use of computing resources amongst devices. The simultaneous and collaborative use includes the use of one or both of software and/or hardware resources of multiple devices. In examples, a user associated with a plurality of devices may provide authorization for two or more of those devices to connect to one another and utilize the resources of each device simultaneously and collaboratively. Once a connection has been established amongst devices, a first device, which may operate on a same or different platform as one or more of the connected devices, may request that one or more actions be executed by one or more of the connected devices. In some examples, prior to the request, the connected devices may expose actions and/or APIs associated with those actions that the first device can request the connected devices execute. For example, a connected device may expose available hardware resources that it can execute actions on/with (e.g., display resources, fingerprint reader resources, radio frequency transmitting resources, camera resources, speaker resources, microphone resources, etc.) and/or software resources it can utilize for executing actions (e.g., email application resources, word processing application resources, image editing application resources, digital assistant application resources, etc.). The connected devices may execute an API and/or action that the first device requests the execution of, and subsequently communicate information associated with the completion of that request/execution back to the first device. The first device may then display and/or present that information via an experience that is native to the first device (e.g., display the received information in a native application, audibly narrate the received information via a native application, etc.).

BRIEF DESCRIPTION OF THE DRAWINGS

Non-limiting and non-exhaustive examples are described with reference to the following figures.

DETAILED DESCRIPTION

Figure 1:
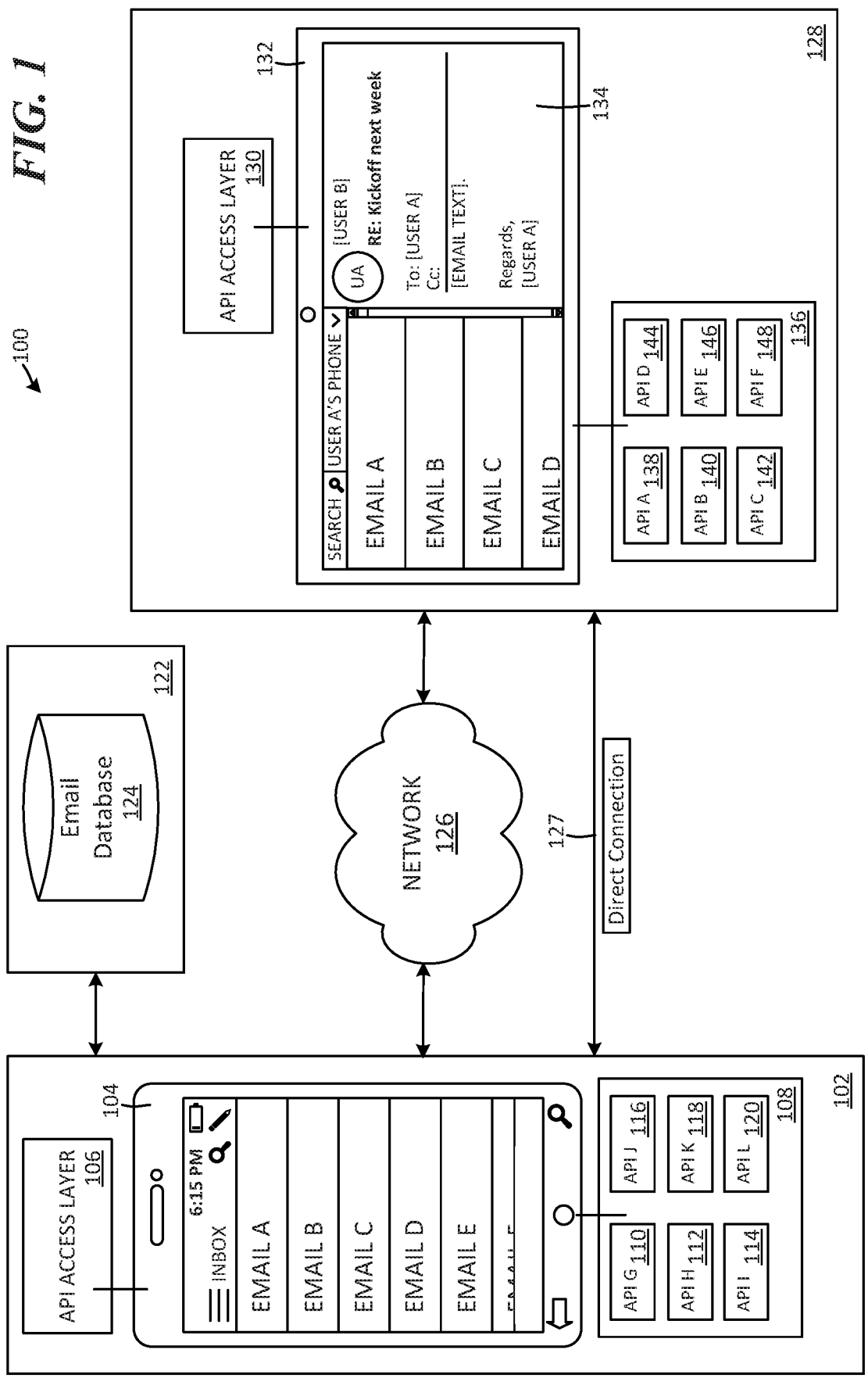
FIG. 1 is a schematic diagram illustrating an example distributed computing environment for assisting with simultaneous and collaborative use of computing resources amongst two computing devices and providing a native email experience across those devices.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for assisting with simultaneous and collaborative use of computing resources amongst devices. The devices that collaborate may operate on the same platform or on different platforms. As used herein, "platform" describes a specific environment comprised of a set of computer hardware and an operating system on which software is executed. For example, a first computing device may be said to run on a first platform that is different than a second platform if it has a unique set of one or both of: hardware components and/or an operating system (including an operating system version), and a second computing device may be said to run on a second platform that is different from the first platform if it has a set of one or both of: hardware components and/or an operating system (including an operating system version), that is different than the first computing device.

When a user authorizes a plurality of her devices to connect with one another, each of those devices may expose resources that each other authorized and connected device may take advantage of. The exposed resources may include APIs for utilizing hardware resources of a device and/or software resources of a device. The authorized devices may connect via local connection (e.g., Bluetooth, WiFi) or remote connection (e.g., Internet). In some examples, the resources that are exposed by a device may depend on whether a local connection or a remote connection has been established between itself and one or more other authorized devices. For example, a device may expose hardware resources as being available to another device if those devices are connected locally, and thus likely to be within physical proximity of a user, and the device may not expose those resources if the devices are connected remotely. Likewise, if devices are connected remotely, those devices may expose software resources to one another (e.g., image processing resources, digital assistant processing resources, etc.), but they may not expose certain hardware resources during that remote connection (e.g., display resources, fingerprint reader resources, etc.). A connected device may request that one or more of the exposed actions be executed by the exposing device and/or devices. The device or devices that receive the request may execute those actions and send information associated with the completion of those actions back to the requesting device. Once the requesting device receives that information, it may present it and/or utilize it in a manner that is native to the requesting device (e.g., display the information via a native application, audibly narrate the information via a native application, transform the information via a native application, etc.).

The systems, methods, and devices described herein provide technical advantages for completing tasks on multiple authorized devices. Processing costs associated with the performance of actions are reduced by allowing devices that can handle certain aspects of a task most efficiently, regardless of the operating systems being utilized, to execute those certain aspects. Additionally, unlike with previous systems where users would have to manually download and login to same applications on each device if those users wanted to utilize the actions associated with those applications, users may utilize the systems, methods and devices described herein to initiate the performance of actions on the users' connected devices, while having the result of those actions transferred to one or more other devices for presenting in a manner that is native to the receiving devices. Thus, utilizing the mechanisms described herein, users do not have to install the same applications on each device to gain access to the functionality provided by the applications across each of their devices. Similarly, whereas application developers would previously have had to write applications that are specific to each operating system and/or have dedicated services for each of those operating systems, developers can utilize the systems, methods and devices described herein to allow cross-platform use of their applications' capabilities and actions via a single operating system version and/or service.

FIG. 1 is a schematic diagram illustrating an example distributed computing environment 100 for assisting with simultaneous and collaborative use of computing resources amongst two computing devices and providing a native email experience across those devices. Computing environment 100 includes primary computing device sub-environment 128, secondary computing device sub-environment 102 and email database sub-environment 122.

Primary computing device sub-environment 128 comprises a first computing device 132, which in this example is a PC computing device operating on a first platform. However, computing device 132 may comprise other device types, such as a mobile computing device, a laptop computing device, a tablet computing device, etc. Secondary computing device sub-environment 102 comprises a second computing device 104, which in this example is a mobile computing device (e.g., a smart phone or tablet). However, computing device 104 may comprise other device types, such as a laptop, a PC, etc. In some examples, computing device 104 and computing device 132 may comprise the same make and/or model of computing device. In other examples, computing device 104 and computing device 132 may comprise different makes and/or models of computing devices.

In this example, a user has accessed an email application on computing device 132. The user may wish to access an email account that is not synced to computing device 132, but that is synced to one of the user's other computing devices. In this example, the email account and messages that the user would like to access on computing device 132 are synced or otherwise associated with computing device 104. The user may not want to permanently sync the email account with both devices via email and password authentication. As such, according to examples, to facilitate viewing and/or performing actions on electronic messages associated with the email account synced with computing device 104, the user may establish a secure connection between computing device 132 and 104. In some examples, the connection may be a direct connection (e.g., a Bluetooth connection, a WiFi connection) as illustrated by direct connection 127. In other examples, the connection may be a remote connection, such as an Internet connection established over Network 126.

Once the connection between computing device 132 and computing device 104 has been established, a user may access an email application that is native to computing device 132 and initiate viewing and/or functionality associated with the email account synced to computing device 104. For example, the user may utilize a drop-down menu as illustrated on the user interface of computing device 132 to view and select one or more available email accounts that are synced to one or more devices associated with the user. In this example, the user has selected "USER A'S PHONE", which corresponds to computing device 104 and the email account that is synced to computing device 104. Although a drop-down selection menu is utilized for illustrative purposes in this example, other mechanisms for initiating cross-device collaboration amongst device hardware and software features are possible. For example, a user may utilize a setting within the email application on computing device 132 to sync the user's emails from the email account synced to computing device 104, a pop-up window may appear when computing device 132 and computing device 104 have been connected, etc.

Regardless of the mechanism by which cross device collaboration amongst computing device 132 and computing device 104 has been initiated, API access layer 106 on computing device 104 may expose one or more APIs to the connected device (in this case computing device 132) for executing the functions associated with those APIs by computing device 104 and/or the connected device. The APIs that computing device 104 exposes to the connected device may be mandated/determined by a user setting. For example, a user may need to authenticate that she is the owner and/or authorized user of each connected device, and once authenticated, she may identify which applications, features, and/or associated APIs to allow the authenticated devices to access. In some examples this may be a device-based security measure such that even when the user has multiple devices with the same software and/or hardware configuration, she can configure same or different API exposure rules for each of those devices and/or each other device that may access those devices.

Computing device 104 may expose one or more APIs to computing device 132, as illustrated by API exposure element 108, which includes API G 110, API H 112, API I 114, API J 116, API K 118 and API L 120. These APIs may include instructions for performing actions associated with one or more applications. In this specific example, the APIs may include a mail retrieval API (e.g., instructions for the email application executed on computing device 104 to obtain email from email database 124), a send mail API (e.g., instructions for sending mail from the email account synced with computing device 104), a delete mail API (e.g., instructions for deleting mail from the email synced with computing device 104), etc. Computing device 132 may request execution of one or more of those APIs to assist with receiving content and/or interacting with content associated with the email account synced to computing device 104. For example, computing device 132 may request that computing device 104 execute one or more APIs for retrieving emails from an email service associated with the email account synced to computing device 104 (e.g., email database 124), and once those emails are retrieved via the executed APIs, computing device 104 may transfer information associated with those emails to computing device 132.

Similarly, computing device 132 may expose one or more APIs to computing device 104, as illustrated by API exposure element 136, which includes API A 138, API B 140, API C 142, API D 144, API E 146 and API F 148. Those APIs may include instructions for interacting with hardware of computing device 132 (e.g., instructions for utilizing a camera on computing device 132 to authenticate the user's identity for signing into the email account synced to computing device 104) and/or instructions for interacting with software executed on computing device 132 (e.g., APIs for displaying email content within email application 134, which is native to computing device 132).

Thus, in this example, computing device 132 requests execution of one or more APIs surfaced by computing device 104 for retrieving emails associated with an email account synced to computing device 104 from email database 124. Computing device 104 retrieves those messages from email database 124 by executing those APIs. Computing device 104 then transfers the email content retrieved from email database 124 to computing device 132, and in some examples, requests that computing device 132 execute one or more of APIs 138-148 for surfacing the transferred emails within the constructs of email application 134, which is native to computing device 132. The user may then read and/or interact with the emails and email account that is synced to computing device 104, without having to sync that account to computing device 132 in a standard manner, while also providing access to information (in this example email information) that might have previously only been accessible by certain platform types (e.g., databases that can only be accessed by devices running a specific operating system). This can be beneficial because it allows a user with a variety of devices to skip the manual steps of syncing various accounts on each device, such as the email account discussed in relation to FIG. 1.

Figure 2:
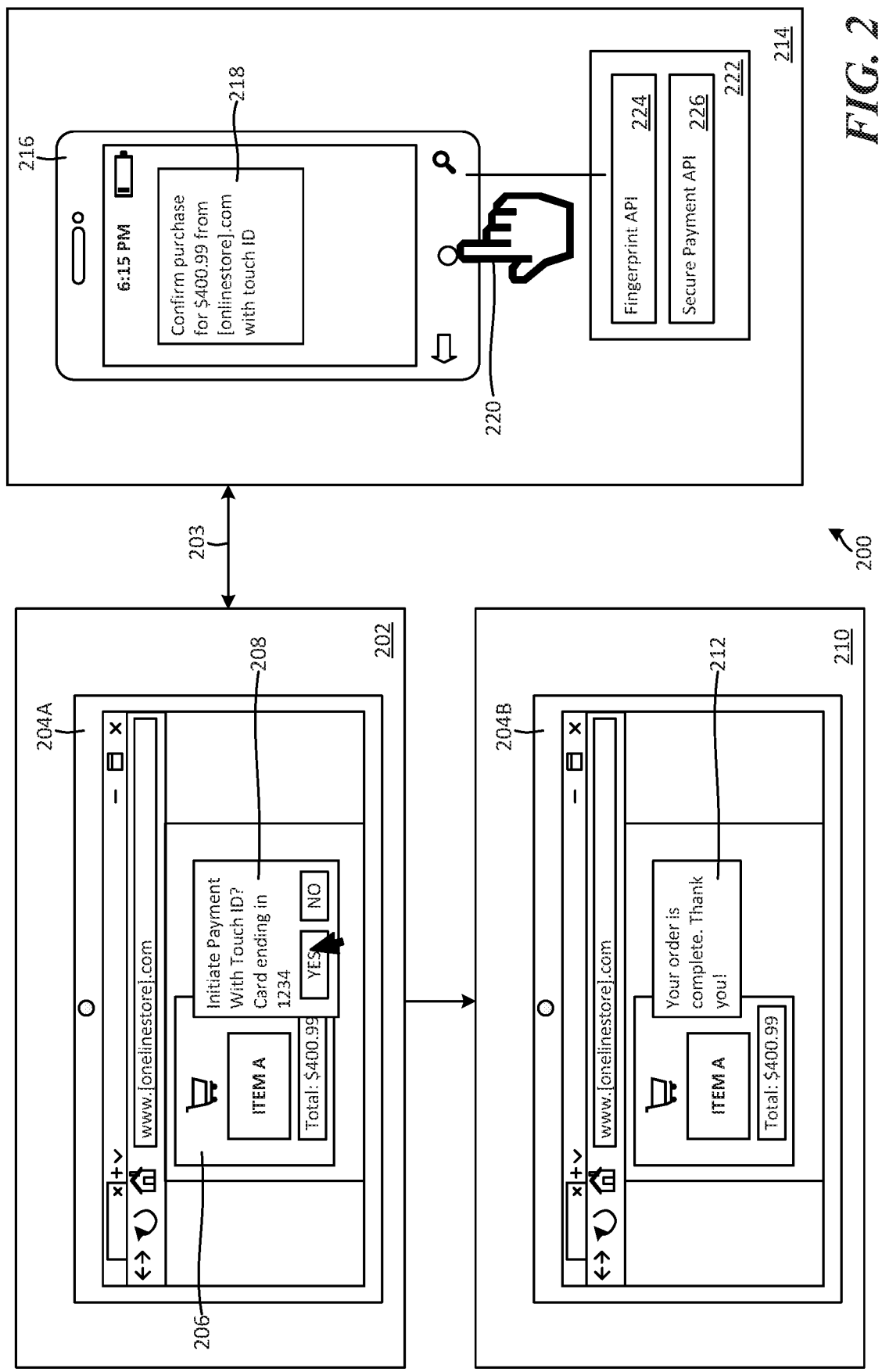
FIG. 2 is another schematic diagram illustrating an example distributed computing environment for assisting with simultaneous and collaborative use of computing resources amongst two computing devices and provisioning hardware resources of one device for use in transactions being executed on a second device.

FIG. 2 is another schematic diagram illustrating an example distributed computing environment 200 for assisting with simultaneous and collaborative use of computing resources amongst two computing devices and provisioning hardware resources of one device for use in transactions being executed on a second device. Computing environment 200 includes first primary computing sub-environment 202, second primary sub-environment 210 and secondary computing sub-environment 214.

First primary computing sub-environment 204A includes computing device 204A, which is the same computing device as computing device 204B in second primary computing sub-environment 210. Computing device 204A illustrates the initiation mechanism for interacting with APIs of computing device 216 in secondary computing sub-environment 214. Computing device 204B illustrates the result of interaction of computing devices 204A/204B with APIs of computing device 216 in secondary computing sub-environment 214.

In this example, a user has accessed an online store (www.[onlinestore].com) and that user has placed an item in her online shopping cart 206. This is illustrated by online shopping cart 206, which includes "ITEM A" and the total price amount due ($400.99) for completing the user's purchase of that item. The online store has surfaced pop-up window 208 for initiating payment of the amount due for the item. Specifically, the text in pop-up window 208 states: "Initiate Payment With Touch ID? Card ending in 1234" with selectable user interface elements for confirming the initiation of that payment or not moving forward with that payment. Thus, computing device 204A, or the online store that the user is accessing on computing device 204A, may have information associated with the card ending in 1234 saved. However, the user may have to authenticate use of that card based on one or more settings associated with the online store's policies, computing device 204A's policies, and/or policies associated with the card itself. For example, the user may have to authenticate their identity via a fingerprint authorization prior to being able to confirm payment for the item.

Computing device 204A does not have a fingerprint reader, and thus the user attempting to purchase the item from the online store may instead utilize one of her other devices to authenticate her identity prior to initiating payment for the item in her cart. In this example, the user's mobile computing device (computing device 216 in secondary sub-environment 214) is within physical proximity of the user, and that device has a fingerprint reader. When the user selects the "Yes" element to initiate payment for the item with touch ID, computing device 204A and computing device 216 may connect to one another (e.g., via Bluetooth, via WiFi, etc.), and computing device 216 may expose one or more APIs to computing device 204A. In other examples, computing device 204A and 216 may have established a connection with one another prior to the user selecting the "Yes" element. Regardless of when the connection was established, in the illustrated example, computing device 216 exposes APIs 222 to computing device 204A, which include fingerprint API 224 and secure payment API 226, which are relevant for purposes of authenticating the identity of the user and initiating payment for the item in the user's shopping cart.

Computing device 204A requests that computing device 216 execute one or both of APIs 224 and 226 when the user touches 220 the fingerprint reader on computing device 216. Computing device 204A may also request that computing device 216 utilize a display API (not shown) to surface pop-up window 218, which states: "Confirm purchase for $400.99 from [onlinestore].com with touch ID". Thus, when the user touches 220 the fingerprint reader, computing device 216 may identify and authorize the user for utilizing a secure payment system via API 224, and confirm payment for the transaction utilizing the stored card ending in "1234" via secure payment API 226. That information may then be sent back to computing device 204A/204B. The confirmation of the payment is illustrated on computing device 204B with the pop-up window 212 that states: "Your order is complete. Thank you!" Thus, in this example, the collaboration between the two connected devices encompasses collaboration of both hardware and software resources.

Figure 3:
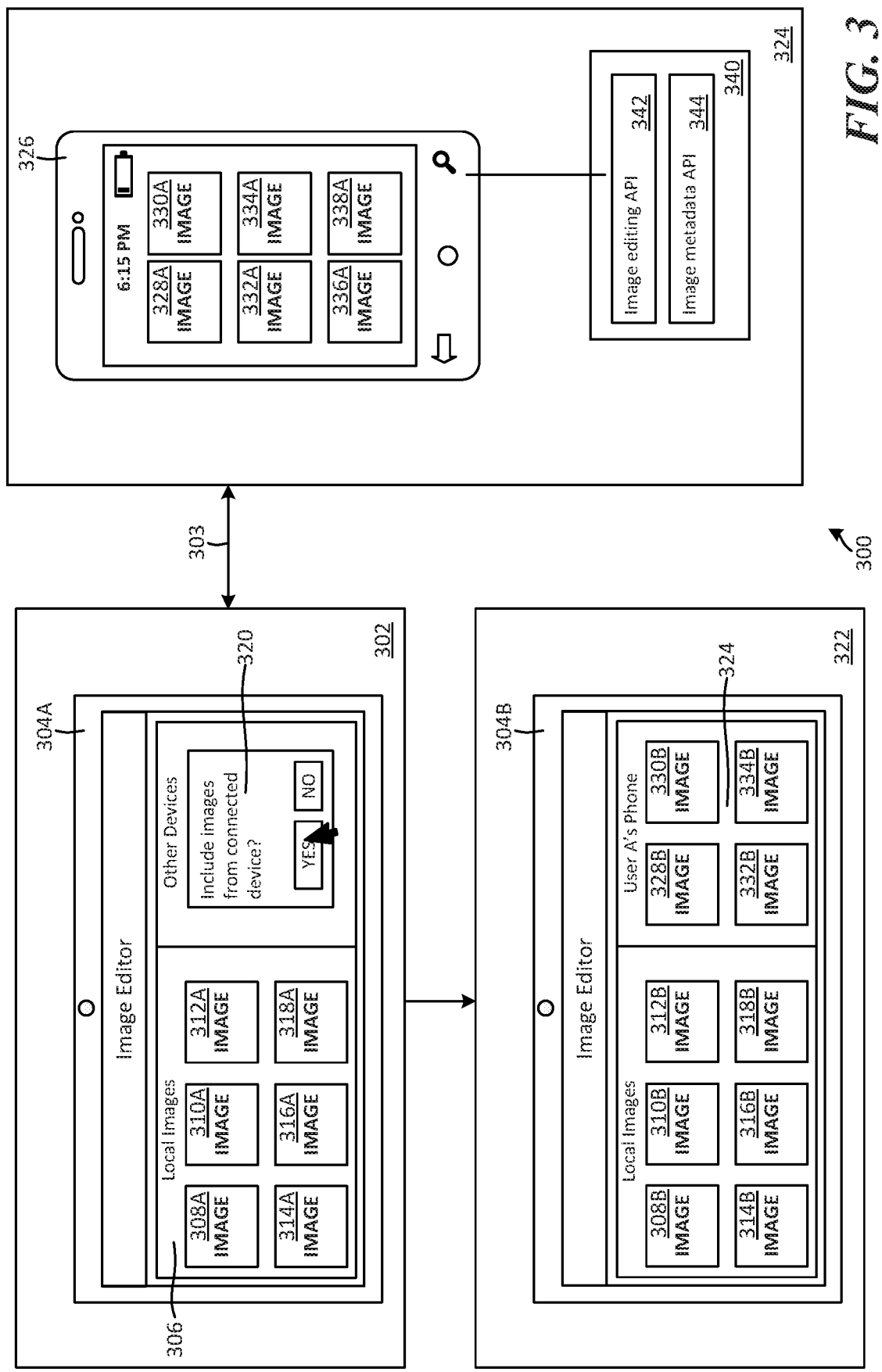
FIG. 3 illustrates another schematic diagram illustrating an example distributed computing environment for assisting with simultaneous and collaborative use of computing resources amongst two computing devices while allowing software actions native to each device to be performed on one or both of those devices.

FIG. 3 illustrates another schematic diagram illustrating an example distributed computing environment 300 for assisting with simultaneous and collaborative use of computing resources amongst two computing devices while allowing software actions native to each device to be performed on one or both of those devices. Computing environment 300 includes first primary computing sub-environment 302, second primary computing sub-environment 322 and secondary computing sub-environment 326.

First primary computing sub-environment 302 includes computing device 304A, which is the same computing device as computing device 304B in second primary computing sub-environment 322. The user interface active on computing device 304A illustrates the initiation mechanism for interacting with the APIs of computing device 326 in secondary computing environment 324. The user interface active on computing device 304B illustrates the result of interaction of computing devices 304A/304B with APIs of computing device 326 in secondary computing environment 324.

In this example, a user has opened an image application on computing device 304A. The left portion of the image application user interface displays local images 306 (images 308A-318A) that are saved locally on computing device 304A and the right portion of the image application includes a window 320 with an option to add images from a connected device (e.g., images from computing device 326) to the already displayed local images 306. Specifically, window 320 includes the text: "Include images from connected device?" "Yes" "No".

In this example, computing device 304A and computing device 326 may be connected locally or remotely via a network (e.g., via the Internet). The connection is illustrated by connection element 303. In examples, a user may have to authenticate her identity as the owner or authorized user of each of devices 304A and 326 prior to the connection between those devices being established. Regardless of the type of connection that is established, when the user selects the "Yes" element in window 320, and thereby confirms that she would like to include images from the connected device (i.e., computing device 326), that confirmation is sent from computing device 304A to computing device 326 and computing device 326 then exposes image APIs 340 to computing device 304A.

For exemplary purposes, the image APIs 340 exposed by computing device 326 are image editing API 342, which may perform actions associated with the editing of images on computing device 326, and image metadata API 344, which may perform actions associated with viewing, creating, editing and/or deleting image metadata on computing device 326. Additionally, images 328A-338A are displayed on computing device 326 to illustrate that those images are stored locally on computing device 326. Those images may be stored on a same or different image application as the image application being executed by computing device 304A.

Computing device 304A may request the image data from computing device 326, and computing device may then transfer that information to computing device 304A. This is illustrated by computing device 304B, which now includes images 328B, 330B, 332B and 334B under the heading "User A's Phone", which are the same images as those stored on computing device 326. The user may scroll through the rest of User A's Phone images to have the remainder of the images from computing device 326 displayed on the image application on computing device 304B. In some examples, the image icons 328B-334B that correspond to the images from computing device 326 may include all of the information associated with the original images from computing device 326. For example, those images may include data corresponding to the full image size and the metadata associated with each of those images. In other examples, the image icons 328B-334B that correspond to the images from computing device 326 may include a subset of the information associated with the original images. For example, those images may include data corresponding to reduced image size for each image, none or a subset of the metadata associated with each of those images, etc.

According to some examples, a user may utilize computing device 304B to modify metadata associated with images 328B-334B via APIs on computing device 326. For example, a user may utilize computing device 304B to add, modify and/or delete metadata associated with one of those images, computing device 304B may request that image metadata API 344 on computing device 326 perform one or more actions corresponding to the user's addition, modification and/or deletion request, computing device 326 may execute those one or more actions via API 344, and image data corresponding to the change accomplished via that API execution may be sent from computing device 326 to computing device 304B. According to additional examples, a user may utilize computing device 304B to edit one or more of images 328B-334B via APIs on computing device 326. For example, certain image editing functions may be available on an image editing application on computing device 326 that are not available on computing device 304B. As such, a user may request editing of one or more images from the image editor application on computing device 304B, that request may be received by computing device 326, computing device 326 may execute image editing API 342 in response to that request, the one or more images may be edited via execution of the image editing API 342, and changes associated with those edits may be sent back to computing device 304B. Thus, computing device 304B and the applications executed by that computing device can leverage not only their own hardware and software resources, but also the hardware and software resources of other connected devices, such as computing device 326. In this example, computing device 304B leverages the processing resources of computing device 326 to accomplish the editing of images and their metadata via software resources of that device (i.e., image editing API 342 and image metadata API 344 and their corresponding applications that they tie into).

Figure 4A:
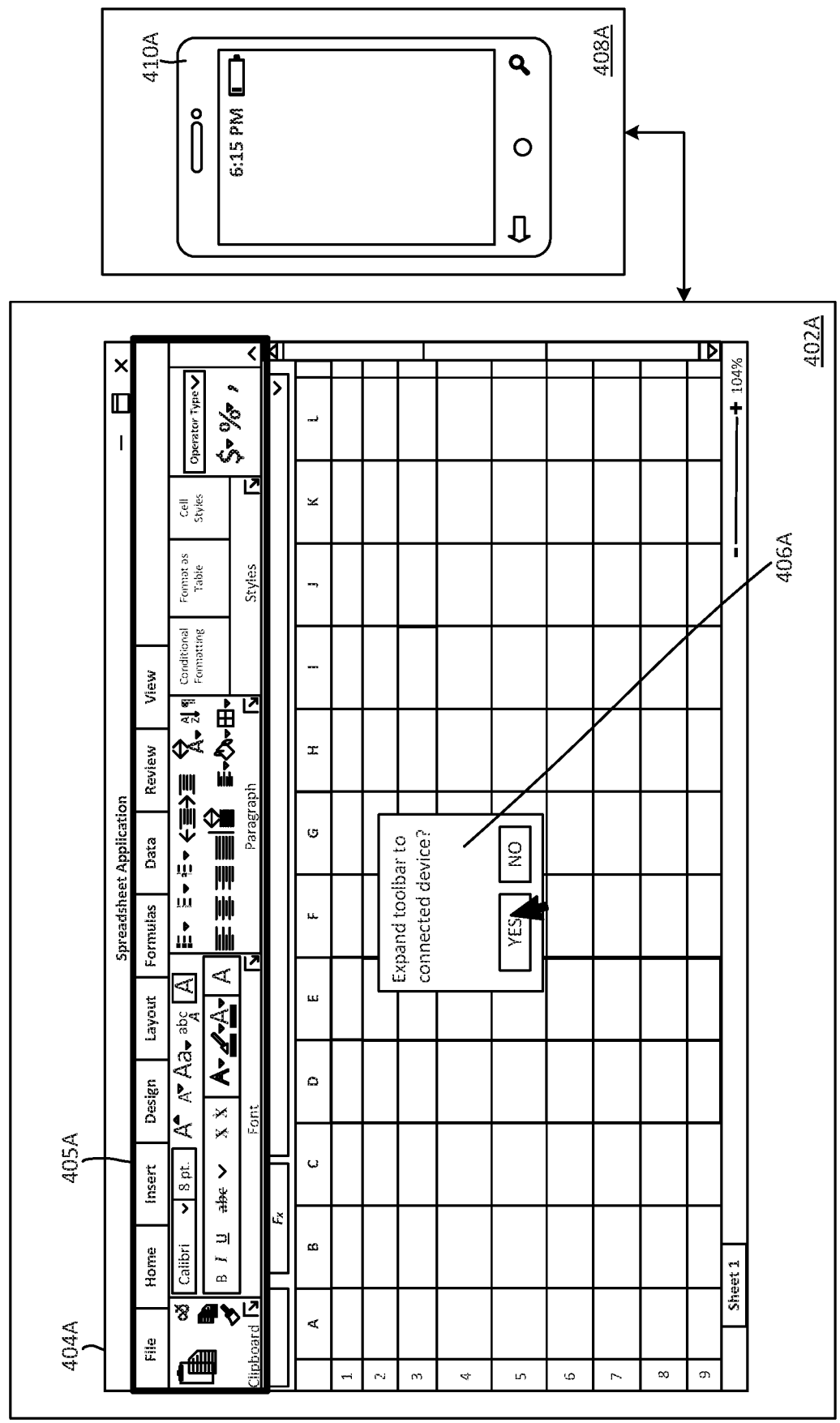
FIG. 4A illustrates an input mechanism for initiating a collaborative use of computing resources across two devices.

FIG. 4A illustrates an input mechanism for initiating a collaborative use of computing resources across two devices. FIG. 4A includes primary device sub-environment 402A and secondary device sub-environment 408A. Primary device sub-environment 402A includes computing device 404A, which is executing a full version of a spreadsheet application. The spreadsheet application executed by computing device 404A includes the spreadsheet input portion (i.e., cells of rows and columns) and a toolbar portion 405A. Secondary device sub-environment 408A includes computing device 410A.

Computing device 404A and 410A may be associated with a same user and/or user account. As such, computing device 404A and 410A and may connect with one another via a local connection and/or a remote connection. For purposes of this example, computing device 404A and computing device 410A are within close proximity of one another such that a user can view both of their displays simultaneously. As such, the user may wish to utilize all or a portion of computing device 410A's display to accommodate a portion of the user interface for the spreadsheet application executed on computing device 404A. For example, the user may wish to move the toolbar portion 405A to computing device 410A so that she can utilize the entirety of computing device 404A's display to navigate the spreadsheet input portion of the spreadsheet application. As such, the user may interact with the spreadsheet application and/or a setting associated with computing device 404A and/or computing device 410A, and have a selectable user interface element presented for transferring a portion of the spreadsheet application display and/or functionality to computing device 410A. In this example, interaction with the selectable user interface element causes pop-up window 406A to be displayed, which states: "Expand toolbar to connected device?" "Yes" "No". If the user selects "Yes", all or a portion of the toolbar portion 405A may be caused to be moved to the connected device—in this example computing device 410A—as more fully illustrated and describe in relation to FIG. 4B.

Figure 4B:
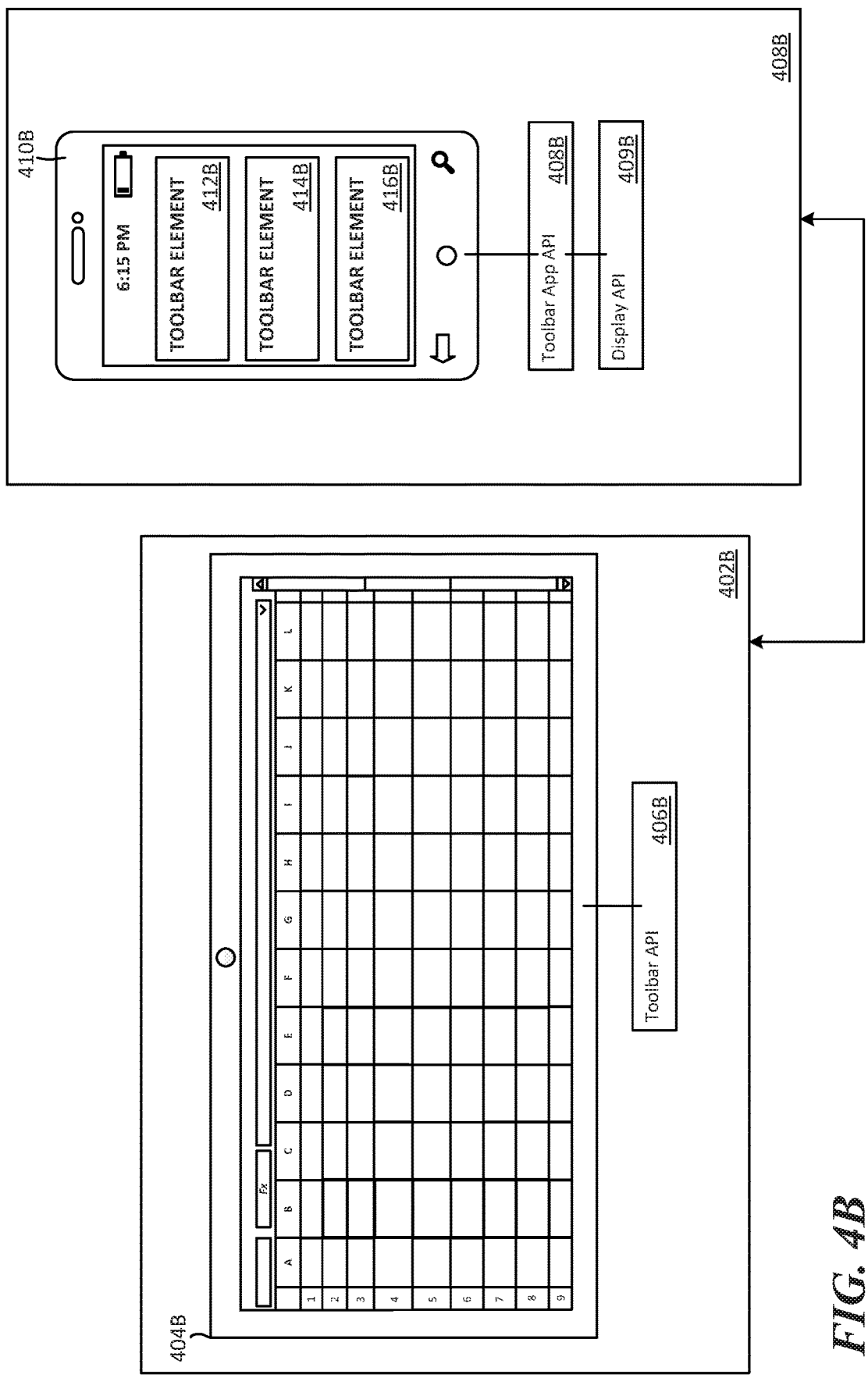
FIG. 4B illustrates the simultaneous and collaborative use of computing resources amongst two computing devices and the provisioning of hardware and software resources of both devices in a collaborative endeavor.

FIG. 4B illustrates the simultaneous and collaborative use of computing resources amongst two computing devices and the provisioning of hardware and software resources of both devices in a collaborative endeavor. FIG. 4B includes primary device sub-environment 402B and secondary device sub-environment 408B. Primary device sub-environment 402B includes computing device 404B, which is the same computing device as computing device 404A in FIG. 4A. Secondary device sub-environment 408B includes computing device 410B, which is the same computing device as computing device 410A in FIG. 4A.

Based on the user's selection to move the toolbar portion of the spreadsheet application from computing device 404B to computing device 410B, all or a portion of the toolbar portion has been moved to computing device 410B. For example, some or all of the toolbar elements from the spreadsheet application executed on computing device 404A/404B may be caused to be displayed in a same or different manner as their original display on computing device 410B. In the illustrated example, the toolbar elements are broken up and displayed in a scrollable interface on computing device 410B. Those toolbar elements are first toolbar element 412B, which may correspond to a first toolbar button/element and/or set of buttons/elements from toolbar portion 405A; second toolbar element 414B, which may correspond to a second toolbar button/element and/or set of buttons/elements from toolbar portion 405A; and third toolbar element 416B, which may correspond to a third toolbar button/element and/or set of buttons/elements from toolbar portion 405A. As such, the toolbar portion of the spreadsheet application has been moved to computing device 410B, and the display of computing device 404B can thus be fully utilized to display only the spreadsheet input portion (i.e., cells of rows and columns).

In some examples, computing device 410B may have a toolbar application and/or spreadsheet toolbar application that can be utilized for displaying and interacting with an application/spreadsheet toolbar transferred to it from another connected computing device, such as computing device 404B. In other examples, computing device 410B may simply display elements of a toolbar from an application/spreadsheet being executed on another computing device, and the interactions with the displayed toolbar may be executed on the other computing device (e.g., computing device 404B).

According to some examples, when computing device 404B and computing device 410B connect and/or when a user requests that the toolbar portion from computing device 404B be transferred to computing device 410B, computing device 410B may expose one or more APIs for accomplishing that action to computing device 404B. In examples where computing device 410B has its own toolbar application, computing device 410B may expose toolbar application API 408B to computing device 404B. Computing device 404B may then request that computing device 410B utilize its toolbar application API 408B to present and allow interaction with the toolbar portion 405A of the spreadsheet application. In examples where computing device 410B does not have its own toolbar application, computing device 410B may expose display API 409B to computing device 404B. Computing device 404B may then request that computing device 410 utilize display API 409B to display elements of toolbar portion 405A. Thus, where display API 409B is utilized, a user may interact with a toolbar element on 410B, that interaction may be sent to computing device 404B, which can then execute an action associated with that interaction via toolbar API 406B on computing device 404B. In this manner, computing device 404B and computing device 410B can simultaneously utilize the hardware and software resources of each of those devices, regardless of the platform on which they operate and/or the software that each of those devices have in relation to a spreadsheet application.

Although a spreadsheet application and its corresponding toolbar is described with reference to these figures for illustrative purposes, other applications, toolbars, and application elements may similarly utilize the mechanisms described herein for utilizing the hardware resources (e.g., display resources, processing resources) and software resources (e.g., application resources, toolbar resources) associated with a multi-device environment. For example, a word processing application may transfer its toolbar to a connected device, an email application may transfer a new message construct to a connected device while maintaining the email application's inbox on a primary device, etc.

Figure 5:
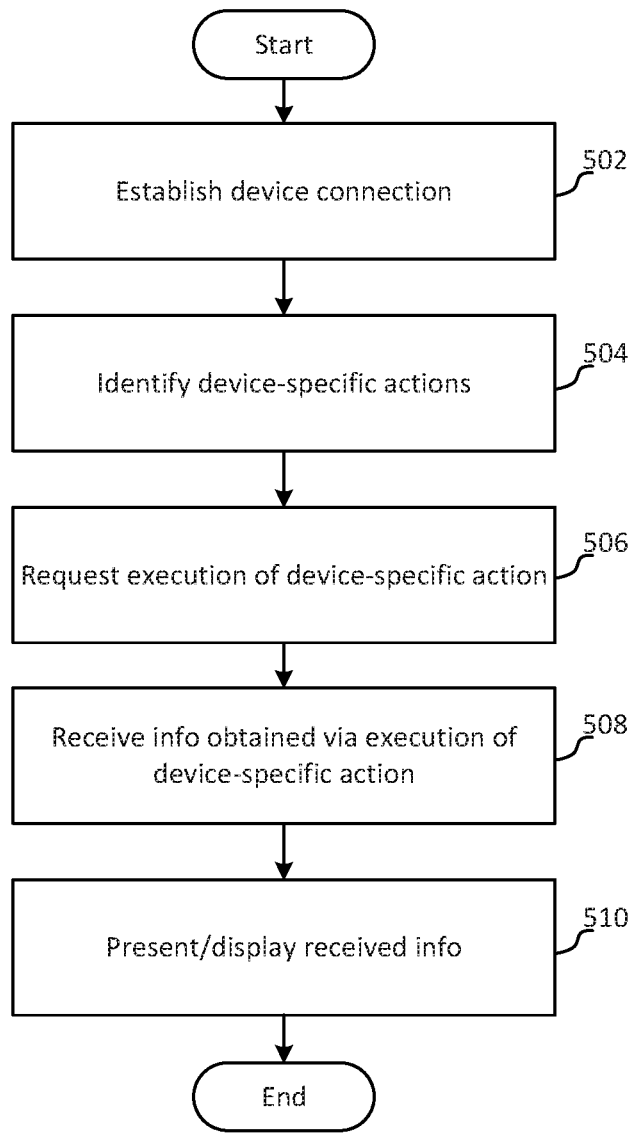
FIG. 5 is an exemplary method for providing a unified cross-platform experience via collaborative use of computing resources across devices.

FIG. 5 is an exemplary method 500 for providing a unified cross-platform experience via collaborative use of computing resources across devices. The method 500 begins at a start operation and flow moves to operation 502.

At operation 502 a connection between a first device and a second device is established. In examples, a user may have to authenticate her identity as being associated with each of the devices prior to the connection being established. In other examples, a user may interact with settings associated with one or more of the devices that allow the one or more devices to connect to one another based on certain criteria. For example, a first setting may allow devices to connect to one another when they are within local communication proximity with one another (e.g., via Bluetooth proximity), and a second setting may allow devices to connect to one another over any distance via a remote connection (e.g., via the Internet). Another setting may allow devices to connect to one another only when requests are received from specific applications on one or more of the devices. Additional settings are possible. In some examples, the first device may operate on a first platform and the second device may operate on a second platform. In other examples, the first and second devices may operate on the same platform.

From operation 502 flow continues to operation 504 where a plurality of executable actions that are specific to the second device are identified by the first device. In some examples, the executable actions may be software actions associated with one or more applications. In other examples, the executable actions may be hardware actions (e.g., display information, receive fingerprint and authenticate, play sound, record video, etc.). In some examples, the actions may be exposed by the second device so that they are discoverable by the first device. The actions may be executable via one or more APIs by the second device. In such examples, the second device may expose the identities and/or the actions associated with those APIs.

From operation 504 flow continues to operation 506 where an application executed on the first device requests execution of at least one of the plurality of executable actions by the second device. For example, if the first device is executing an email application that is native to the first device, it may request that an email application that is native to the second device execute an action to retrieve email from an email account linked to the second device. In another example, if the first device is executing an image viewing and/or editing application native to the first device, the first device may request that an image viewing and/or editing application native to the second device perform one or more operations on an image stored locally on the second device (e.g., modify image metadata, delete image, delete image metadata, modify image features, etc.). In yet another example, if the first device is executing a productivity application, the first device may request that the second device use a display API to present all or a portion of features of the productivity application. In another example, the first device may request that the second device use a hardware API (e.g., a fingerprint reader API, a camera API) to authenticate the identity of a user on the second computing device. In still another example, the first device may request that the second device use a digital assistant API to obtain an answer to a user query received by the first device and/or complete a request related to a user command received by the first device.

From operation 506 flow continues to operation 508 where information obtained via execution of the at least one executable action is received by the first device. Thus, in the last example, the second device may transmit information indicating that the user either has or has not been authenticated based on use of a hardware API to the first device. In an example where an image editing API has been utilized by the first device to edit an image, the edited image data may be transmitted to the first device. In an example where the second device has retrieved one or more emails from an email service linked to the second device, the second device may transmit those retrieved emails to the first device.

From operation 508 flow continues to operation 510 where the information received by the first device from the second device is presented and/or displayed by the first device. For example, the first device may display information obtained via execution of the requested action/API by the second device (e.g., display emails retrieved by the second device, display updated image as edited by the second device, display result of toolbar interaction received via second device, display digital assistant query answer obtained via execution of digital assistant API on second device, etc.).

From operation 510 flow continues to an end operation and the method 500 ends.

Figure 6:
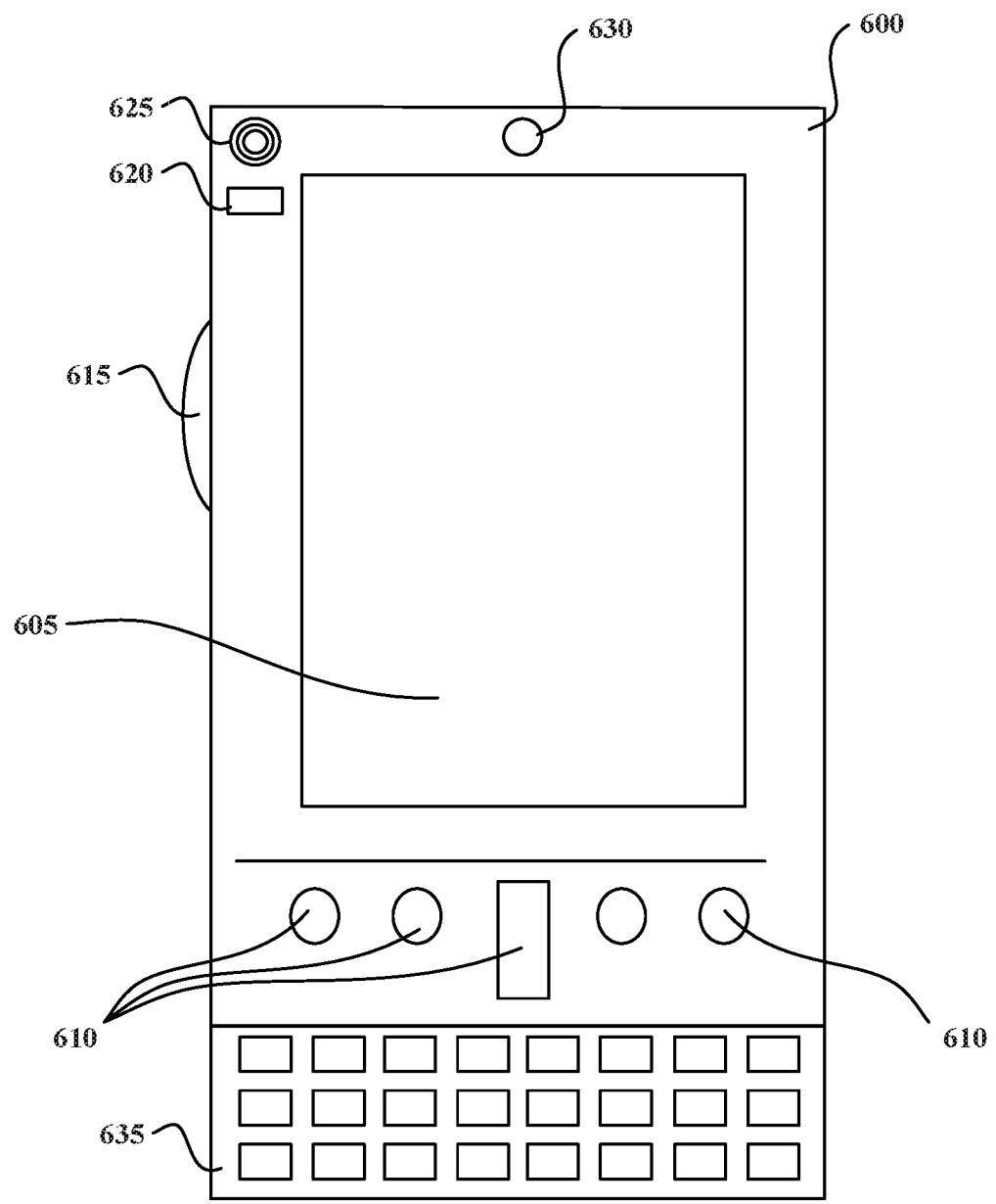
FIGS. 6 and 7 are simplified diagrams of a mobile computing device with which aspects of the disclosure may be practiced.
Figure 7:
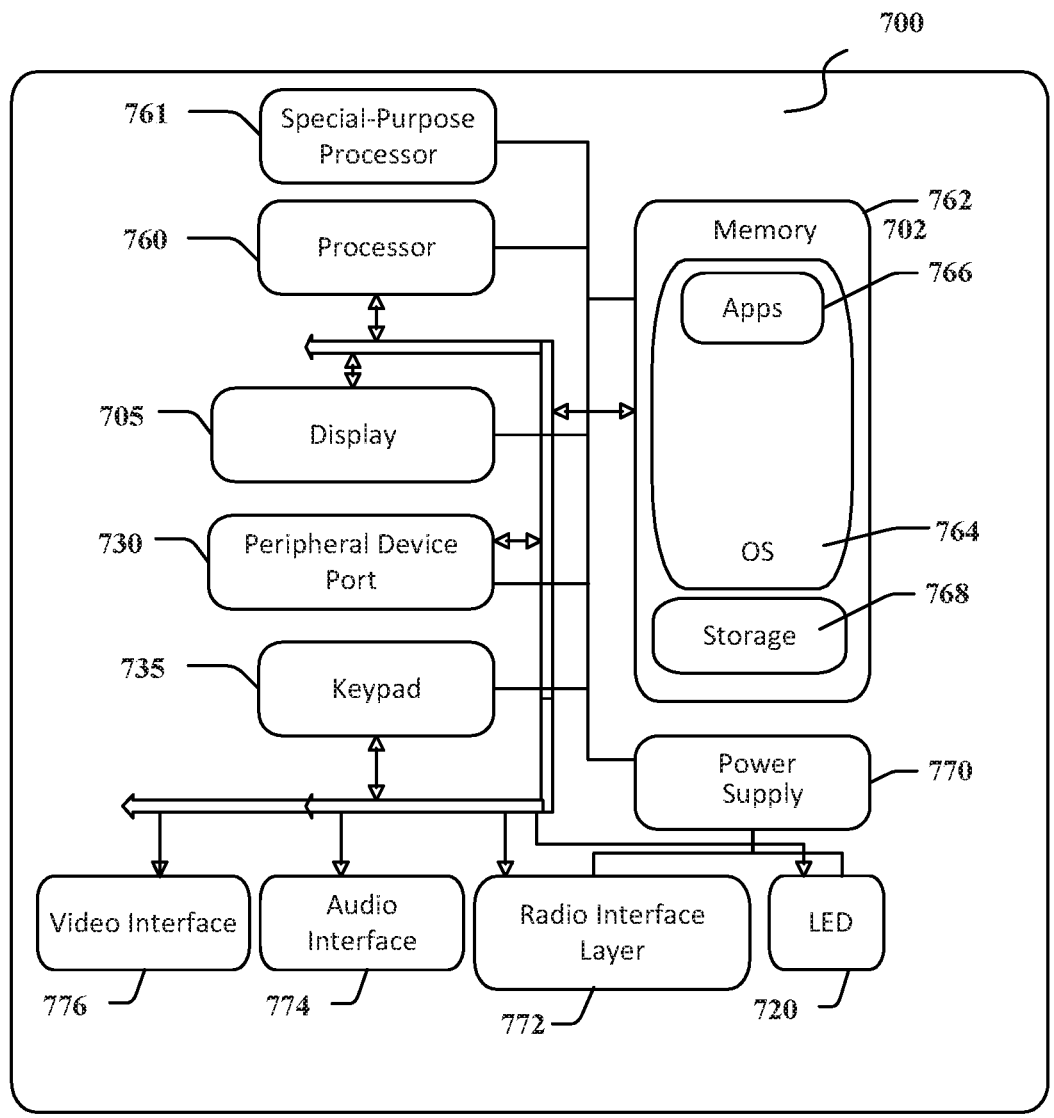

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a cross-device resources collaboration application.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
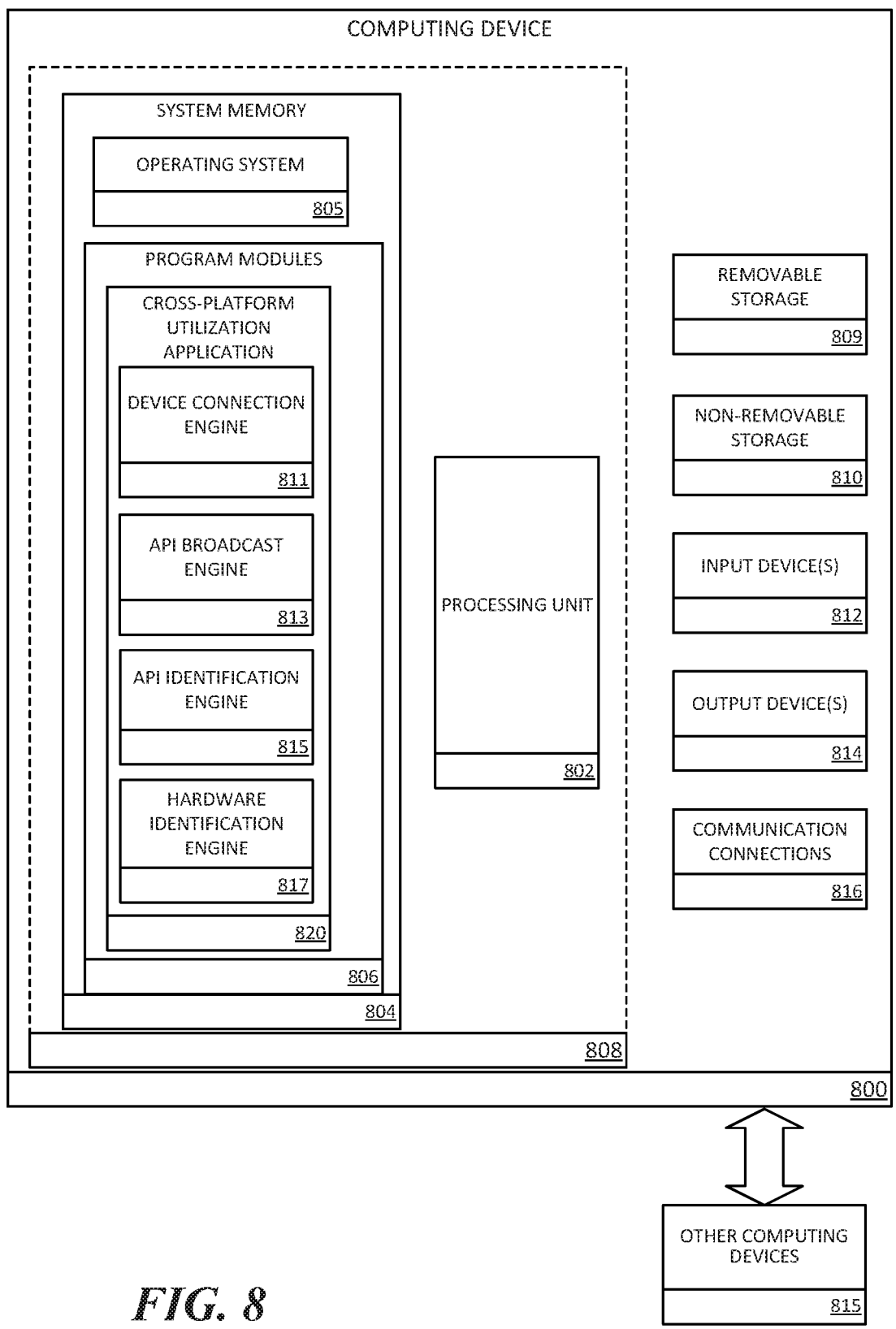
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with cross-device resource collaboration. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more cross-platform transformation programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., cross-platform utilization application 820) may perform processes including, but not limited to, the aspects, as described herein. According to examples, device connection engine 811 may perform one or more operations associated with determining which devices to connect to and identifying what types of connections to utilize in establishing those connections. API broadcast engine 813 may perform one or more operations associated with exposing one or more APIs to connected devices based on rules, policies and/or settings. API identification engine 815 may perform one or more operations associated with discovering other device capabilities for devices that are connected to a device executing API identification engine 815. Hardware identification engine 817 may perform one or more operations associated with identifying hardware resources available on connected devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
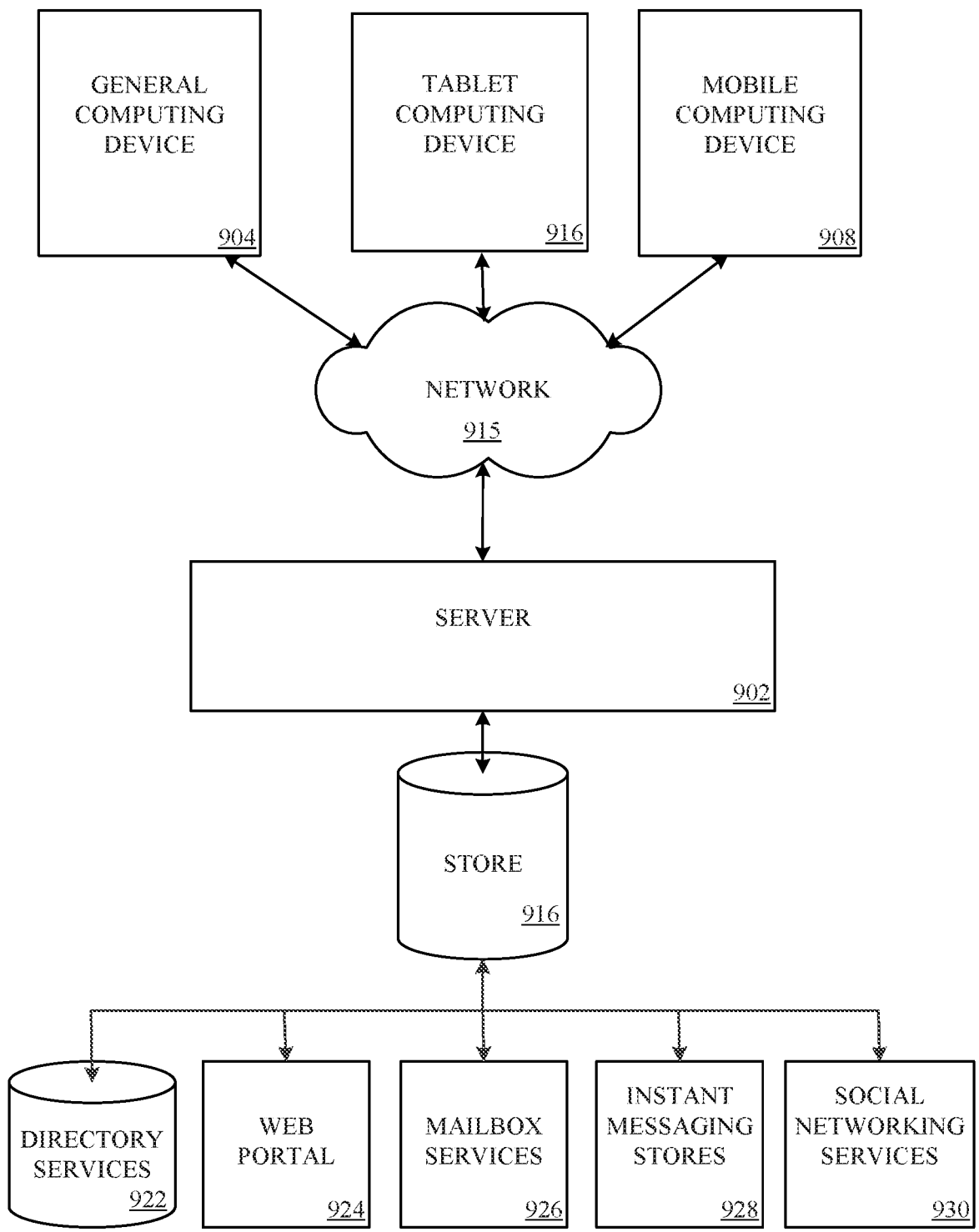
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data usable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for providing a unified cross-platform experience, the method comprising:

determining that a user account is an owner or authorized user of a first device and a second device;

establishing, based at least in part on the determination that the user account is the owner or authorized user of the first device and the second device, a local connection between the first device and the second device, wherein the first device operates on a first platform and the second device operates on a second platform;

identifying, by the first device, a plurality of hardware APIs on the second device that are invokable for executing camera, fingerprint reader, or display actions by the second device, wherein the plurality of hardware APIs are exposed by the second device based on the connection being a local connection;

requesting, by a first application executed on the first device, execution of at least one of the camera, fingerprint reader, or display actions by the second device;

receiving, by the first device, first information obtained via execution of the at least one camera, fingerprint reader, or display action;

causing a result corresponding to the first information obtained via execution of the at least one camera, fingerprint reader, or display action to be displayed by the first application executed on the first device;

determining that the first device and the second device are no longer locally connected;

establishing a remote Internet connection between the first device and the second device;

identifying, by the first device, a plurality of software APIs on the second device each of which are invokable for executing one of a plurality of actions, wherein the plurality of software APIs do not include the plurality of hardware APIs, wherein the plurality of hardware APIs are not exposed by the second device based on the connection being a remote connection;

requesting, by a second application executed on the first device, execution of a first action of the plurality of actions by the second device; and causing a result corresponding to second information obtained via execution of the first action by the second device to be displayed by the second application executed on the first device.

2. The method of claim 1, wherein the first platform comprises a first device type and the second platform comprises a second device type.

3. The method of claim 2, wherein the plurality of hardware APIs actions are specific to the second device based on the hardware resources of the second device.

4. The method of claim 1, wherein the first platform comprises a first operating system type and the second platform comprises a second operating system type.

5. The method of claim 4, wherein the plurality of hardware APIs are specific to the second device based on the operating system of the second device.

6. The method of claim 1, wherein the plurality of software APIs comprise one or more APIs for executing image editing resources on the second device.

7. The method of claim 1, wherein the plurality of software APIs comprise one or more APIs for executing digital assistant processing resources on the second device.

8. The method of claim 1, wherein the plurality of hardware APIs further comprise one or more toolbar APIs.

9. A system for providing a unified cross-platform experience, comprising:
a memory for storing executable program code; and
one or more processors, functionally coupled to the memory, the one or more processors being responsive to computer-executable instructions contained in the program code and operative to:

determine that a user account is an owner or authorized user of a first device and a second device;

establish, based at least in part on the determination that the user account is the owner or authorized user of the first device and the second device, a local connection between the first device and the second device, wherein the first device operates on a first platform and the second device operates on a second platform;

expose, to the first device, an identity of a plurality of hardware APIs that are invokable for executing camera, fingerprint reader, or display actions by the second device, wherein the plurality of hardware APIs are exposed based on the connection being a local connection;

receive, from the first device, a request to execute at least one of the camera, fingerprint reader, or display actions;

execute the requested camera, fingerprint reader, or display action;

provide, by the second device to the first device, first information obtained via execution of the requested camera, fingerprint reader, or display action for display in a requesting application of the first device;

establish a remote Internet connection between the first device and the second device;

expose, to the first device, an identity of a plurality of software APIs each of which are invokable for executing one of a plurality of actions on the second device by the first device, wherein the plurality of software APIs do not include the plurality of hardware APIs, and wherein the plurality of hardware APIs are not exposed by the second device based on the connection being a remote connections;

receive, from the first device, a request to execute a first action of the plurality of actions;

execute the first action; and provide, by the second device to the first device, second information obtained via execution of the first action.

10. The system of claim 9, wherein the plurality of software APIs comprise one or more APIs for executing image editing resources on the second device.

11. The system of claim 9, wherein the plurality of software APIs comprise one or more APIs for executing digital assistant processing resources on the second device.

12. The system of claim 9, wherein the plurality of hardware APIs further comprise one or more toolbar APIs.

13. A computer-readable storage device comprising executable instructions that, when executed by one or more processors, assist with providing a unified cross-platform experience, the computer-readable storage device including instructions executable by the one or more processors for:

determining that a user account is an owner or authorized user of a first device and a second device;

establishing, based at least in part on the determination that the user account is the owner or authorized user of the first device and the second device, a local connection between the first device and the second device, wherein the first device operates on a first platform and the second device operates on a second platform;

identifying, by the first device, a plurality of hardware APIs on the second device that are invokable for executing camera, fingerprint reader, or display actions by the second device, wherein the plurality of hardware APIs are exposed by the second device based on the connection being a local connection;

requesting, by a first application executed on the first device, execution of at least one of the camera, fingerprint reader, or display actions by the second device;

receiving, by the first device, first information obtained via execution of the at least one camera, fingerprint reader, or display action;

causing a result corresponding to the first information obtained via execution of the at least one camera, fingerprint reader, or display action to be displayed by the first application executed on the first device;

determining that the first device and the second device are no longer locally connected;

establishing a remote Internet connection between the first device and the second device;

identifying, by the first device, a plurality of software APIs on the second device each of which are invokable for executing one of a plurality of actions, wherein the plurality of software APIs do not include the plurality of hardware APIs, wherein the plurality of hardware APIs are not exposed by the second device based on the connection being a remote connections;

requesting, by a second application executed on the first device, execution of a first action of the plurality of actions by the second device; and causing a result corresponding to second information obtained via execution of the first action by the second device to be displayed by the second application executed on the first device.

14. The computer-readable storage device of claim 13, wherein the first platform comprises a first device type and the second platform comprises a second device type.

15. The computer-readable storage device of claim 14, wherein the plurality of hardware APIs are specific to the second device based on the hardware resources of the second device.

16. The computer-readable storage device of claim 13, wherein the first platform comprises a first operating system and the second platform comprises a second operating system.

17. The computer-readable storage device of claim 16, wherein the plurality of hardware APIs are specific to the second device based on the operating system of the second device.

18. The computer-readable storage device of claim 13, wherein the plurality of software APIs comprise one or more APIs for executing image editing resources on the second device.

19. The computer-readable storage device of claim 13, wherein the plurality of software APIs comprise one or more APIs for executing digital assistant processing resources on the second device.

20. The computer-readable storage device of claim 13, wherein the plurality of hardware APIs further comprise one or more toolbar APIs.

* * * * *